March 7, 1967     F. A. DAVID     3,307,802
SHIPPING REEL

Filed Aug. 19, 1964     2 Sheets-Sheet 1

INVENTOR.
FRANK A DAVID
BY
Thomas A. Meehan
& W. A. Schaich
ATTORNEYS

March 7, 1967  F. A. DAVID  3,307,802
SHIPPING REEL

Filed Aug. 19, 1964  2 Sheets-Sheet 2

INVENTOR.
FRANK A DAVID
BY
Thomas A. Meehan
& W. A. Schaich
ATTORNEYS

United States Patent Office 3,307,802
Patented Mar. 7, 1967

3,307,802
SHIPPING REEL
Frank A. David, Collinsville, Ill., assignor to Owens-Illinois, Inc., a corporation of Ohio
Filed Aug. 19, 1964, Ser. No. 390,656
6 Claims. (Cl. 242—118.8)

This invention relates to a reel of novel and advantageous construction for the shipment, storage and dispensing of a coiled ribbon of material. More particularly, the invention relates to a reel for the storage, shipment and dispensing of wrapping blanks of paper, plastic and the like coiled in a ribbon of separatable units and used for the wrapping of a plurality of individual containers as, for example, a wrapper for a six-pack of beer, soft drinks and the like.

In accordance with the present invention there is provided a reel which may be constructed of several pieces of flat relatively inexpensive material, such as corrugated paperboard, and which may be readily assembled therefrom at the point of use without the need for relatively expensive machinery or equipment. For a further understanding of the invention, attention is directed to the following portion of the specification, the claims, and the drawing.

Figure 2:
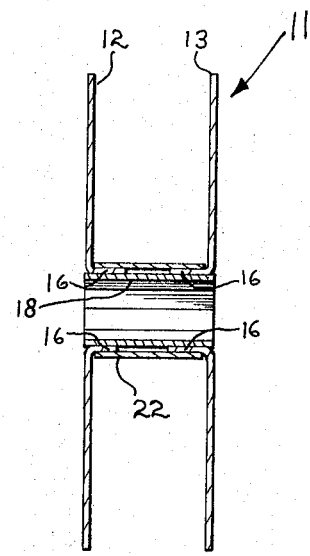
FIG. 2 is a sectional view taken on line 2—2 of FIG. 1.
Figure 1:
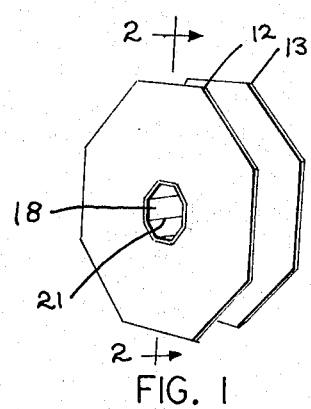
FIG. 1 is a perspective view of a reel constructed in accordance with the present invention.
Figure 3:
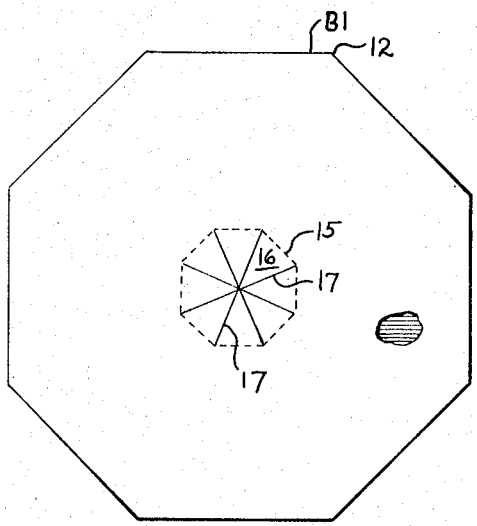
FIGS. 3–5 are details of the flat blanks from which the elements of the reel of FIGS. 1 and 2 are formed.

As shown in FIGS. 1 and 2 a reel, shown generally at 11, constructed in accordance with the present invention comprises a pair of annular panels 12 and 13, preferably identical in construction, spaced apart from one another and disposed parallel to one another. Each of panels 12 and 13 may be formed from the blank of corrugated paperboard B1 illustrated at FIG. 3. As shown in FIG. 3, the interior portion of blank B1 is provided with an endless score line 15 which, in the preferred embodiment, defines an equilateral polygon and is shown as defining an equilateral octagon. A plurality of tabs which are deflectable away from the plane of blank B1 are formed within the outline of score line 15 by means of a plurality of lines of cut 17. Each line of cut 17 extends from a point of origin disposed along score line 15, preferably at the end of each side of the equilateral polygon, to a common point of termination shown as being at the center of the plane defined by score line 15. In the trade the configuration defined in blank B1 by means of score line 15 and cut lines 17 is commonly referred to as a "sunburst" cut. In the assembled shipping reel 11 each of the tabs 16 associated with each of annular panels 12 and 13 is deflected to a position extending generally normally to the plane of the respective annular panel and extending toward the other of the pair of annular panels. Tabs 16 are retained in their deflected positions by means of a spindle 18 which extends through annular panels 12 and 13 interiorly of tabs 16 and in engagement therewith.

Figure 4:
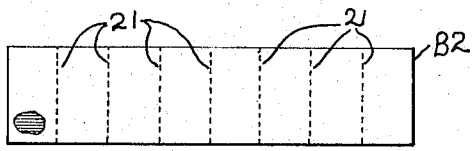

Spindle 18 is formed from a bank of material B2 such as corrugated paperboard, as shown in FIGURE 4, which is provided with suitable score lines 21 to permit blank B2 to be folded into the configuration defined by score line 15 of the annular panels. In the assembled reel each score line 21 is disposed at the root of an angle formed by successive sides of the polygon defined by score line 15, thereby to prevent relative rotation between annular panels 12 andl 13 and spindle 18. Since tabs 16 are formed from the same sheet as the remainder of the respective annular panel they will tend to spring back to their original position coplanar with panels 12 and 13 and will thereby exert a bearing force against spindle 18 which will tend to resist relative axial movement between spindle 18 and panels 12 and 13. When each of blanks B1 is formed of a grade of corrugated paperboard of the order of stiffness of 200 pound C flute board, tabs 16 will normally have enough springing action against spindle 18 to prevent separation of panels 12 and 13 in service without utilizing additional means such as glue, staples and the like, to fix the predetermined spacing therebetween. However, the utilization of such means is not outside the scope of this invention.

Figure 6:
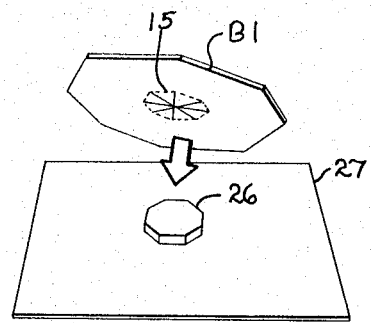
FIGS. 6–9 illustrate the succession of steps followed in the assembly of the reel of FIGS. 1 and 2 from the elements illustrated at FIGS. 3–5.
Figure 7:
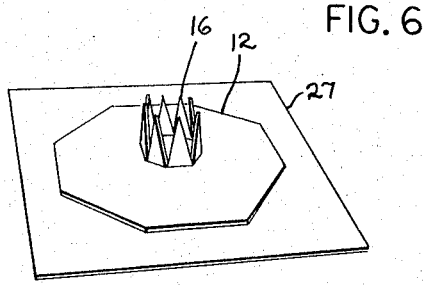
Figure 8:
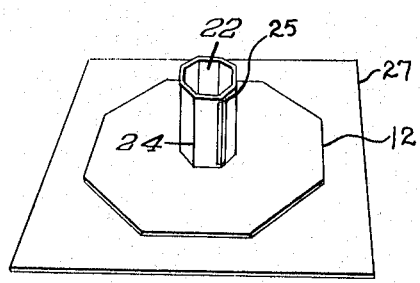
Figure 5:
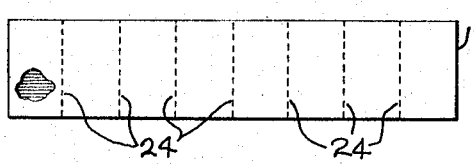

Reel 11 is further provided with a tubular spacer 22 extending between annular panels 12 and 13 and circumposing spindle 18 and tabs 16. Tube 22 is formed of a blank of corrugated paperboard B3, as shown in FIGURE 5, which is provided with suitable score lines 24 to permit blank B3 to be folded into a tube whose transverse cross-section resembles the polygon defined by score line 15 of blank B1. The forming of tube 22 from blank B3 is accomplished by bringing the ends of blank B3 into abutting relationship and securing them to one another, as by means of a strip of tape 25 shown in FIGURE 8.

Tubular spacer 22 is of such an extent in its transverse section as to fit snugly over the exterior of inwardly deflected tabs 16 when score lines 24 are brought into register with the corners of the polygon defined by score line 15 thereby to prevent relative rotation between spacer 22 and panels 12 and 13. Tubular spacer 22 further provides a surface which is smooth in the axial direction about which the material to be coiled in reel 11 may be wound. Tubular spacer 22 also serves to prevent annular panels 12 and 13 from being pushed closer to one another when a plurality of reels 11 are stacked one upon another.

Figure 9:
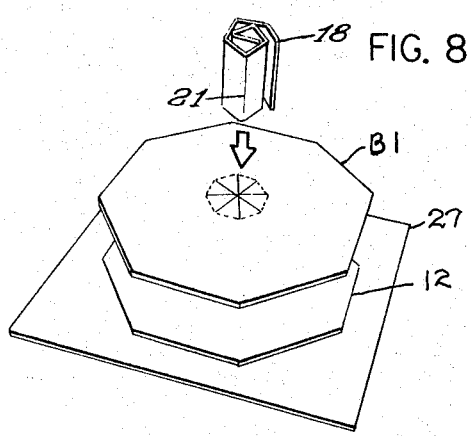

A reel in accordance with the foregoing description can be readily and economically assembled even in small quantities, which is desirable where it is preferred to assemble reel 11 only immediately prior to its use, by means of equipment which consists only of a relatively inexpensive jig 26 that can be formed out of materials such as wood mounted on a flat surface 27 such as a bench top. Jig 26 is formed in the shape of a polygon corresponding to the polygon defined by score line 15 of blank 14 but of a slightly lesser extent so that it can fit snugly within the outline of score line 15. In the assembly operation one of blanks B1 is placed over jig 26 in such a fashion that the corners of jig 26 and the corners of the polygon defined by line 15 are in registry with one another. Blank B1 is then pushed downwardly over jig 26 with the result that jig 26 serves to upwardly deflect each of the tabs 16 of the blank. When blank B1 is in such a position with respect to jig 26, an end of spacer 22, formed by folding blank B3 into tubular assemblement on foldlines 24, is brought into contact with blank B1 in such a manner that tubular spacer 22 circumposes score line 15 and tabs 16 extend upwardly into the interior of tubular spacer 22. (See FIG. 8). After tubular spacer 22 is in position with respect to said one of the blanks B1, the second of the blanks B1 is brought into contact with the other end of tubular spacer 22 (see FIG. 9) and is aligned therewith in such fashion that tubular spacer 22 circumposes score line 15 thereof and wherein the corners formed by the sides of the polygon defined by line 15 are brought into registry with the score lines 24 of the blank B3 from which tubular spacer 22 is formed. After the second of blanks B1 is in such position with respect to tubular spacer 22, the blank B2 from which spindle 18 is formed is folded in such a manner that it is of reduced size and may be inserted downwardly into tubular spacer 22 through the opening described by the score line of the second of the blanks B1, as illustrated in FIG. 9. The insertion of folded blank B2 (identified by the reference numeral 18 in FIG. 9) in this manner serves to downwardly deflect all of the tabs 16 associated with the second of blanks B1 into the interior of said tubular spacer. The insertion of folded blank B2 is continued until such time as the leading end thereof is circumscribed by the tabs 16 of the first of blank B1. Thereupon folded blank B2 is reshaped to a larger size to form spindle 18 which conforms to the configuration of the interior of the polygon defined by each of the score lines 15. Thereafter all of the constituent elements of reel 11 are removed from jig 26 and the blank B2 from which spindle 18 has been formed is subsequently advanced slightly forward into the interior of tubular spacer 22 to bring the leading end of spindle 18 into registry with the outside surface of annular panel 12, a step which cannot be accomplished while the elements are located atop jig 26 because of the presence of jig 26 itself.

It will be apparent from the foregoing description of the invention that various modifications can be made within the spirit and scope of the following claims.

I claim:
1. A shipping reel formed of relatively stiff sheet-like material, said reel comprising in combination:
   a pair of annular panels in spaced parallel relationship, said panels each having an inner and outer periphery defining a polygon,
   a plurality of tabs integral with and foldably connected to the inner periphery of each panel, said tabs extending inwardly toward the other of the panels,
   a spindle disposed interiorly of and coextensive with said folded array of tabs, said spindle being polygonal cross sectional configuration and in surface abutment with said tabs, said spindle defining a polygonal opening adapted to engagingly receive a polygonal mandrel such that rotation of the mandrel will rotate the reel,
   a tubular spacer extending between said panels, said spacer being of polygonal cross sectional configuration and in surrounding surface abutment with said tabs, whereby said panels, spindle and spacer are held in relative nonrotational engagement, without auxiliary fastening means,

2. A shipping reel construction in accordance with claim 1 wherein said tabs and said panels are formed from a single sheet of relatively stiff material whereby said tabs have a tendency to return to a position coplanar with said panels and wherein the engagement between said spindle and said tabs results from said tendency of said tabs.

3. A shipping reel as claimed in claim 1 wherein said tabs are triangular.

4. A shipping reel as claimed in claim 1 wherein the outer polygonal peripheries of the spaced panels are congruent and in registering relationship.

5. A reel carton formed of relatively stiff sheet-like material, said reel comprising in combination:
   a pair of generally parallel-spaced, annular panels, the inner and outer periphery of each of said panels defining a polygon,
   flaps formed on said panels to extend foldably and normally from the sides of said inner polygonal periphery of each of said panels toward the other panel,
   a spindle member telescopically received by said array of flaps and being of polygonal cross sectional configuration conforming to that of the inner periphery to thereby define a polygonal opening adapted to engagingly receive a polygonal mandrel such that rotation of the mandrel will effect rotation of the reel, and
   a sleeve telescopically and abuttingly surrounding said array of flaps and likewise having the same said polygonal cross sectional configuration, whereby said panels, spindle and sleeve are held in relative nonrotational engagement without auxiliary fastening means.

6. A reel as claimed in claim 5, wherein said sleeve is of a length corresponding to the distance between panels to hold said panels in corresponding spaced relationship.

References Cited by the Examiner

UNITED STATES PATENTS

| 3,059,763 | 10/1962 | Eifrid | 242—118.8 X |
| 3,093,343 | 6/1963 | Welshenbach et al. | 242—118.8 |

FOREIGN PATENTS

| 141,590 | 6/1951 | Australia. |
| 1,096,469 | 2/1955 | France. |
| 530,838 | 12/1940 | Great Britain. |

FRANK J. COHEN, *Primary Examiner.*

GEORGE F. MAUTZ, *Examiner.*

UNITED STATES PATENT OFFICE
CERTIFICATE OF CORRECTION

Patent No. 3,307,802                            March 7, 1967

Frank A. David

It is hereby certified that error appears in the above numbered patent requiring correction and that the said Letters Patent should read as corrected below.

Column 3, line 33, strike out "each"; line 34, strike out "defining a polygon." and insert instead -- , said inner periphery defining a polygon, --; line 39, after "being" insert -- of --; line 44, after "reel," insert -- and --; column 4, line 16, strike out "and outer".

Signed and sealed this 7th day of November 1967.

(SEAL)
Attest:

Edward M. Fletcher, Jr.                           EDWARD J. BRENNER
Attesting Officer                                     Commissioner of Patents